United States Patent

[11] 3,615,207

| [72] | Inventor | Nathan D. Lee |
| | | Lambertville, N.J. |
| [21] | Appl. No. | 833,676 |
| [22] | Filed | June 16, 1969 |
| [45] | Patented | Oct. 26, 1971 |
| [73] | Assignee | FMC Corporation |
| | | New York, N.Y. |

[54] PRODUCTION OF HYDROGEN PEROXIDE BY ANTHRAQUINONE PROCESS
4 Claims, No Drawings

[52] U.S. Cl. .................................................. 23/207, 252/466 PT
[51] Int. Cl. ................................................. C01b 15/02, B01j 11/08
[50] Field of Search ...................................... 23/207, 141; 252/466 PT

[56] References Cited
UNITED STATES PATENTS
2,620,314  12/1952  Hoekstra ..................... 23/141 X
3,108,888  10/1963  Bugosh ......................... 23/141
3,328,128  6/1967  Kabisch ........................ 23/207

FOREIGN PATENTS
585,331  10/1959  Canada ......................... 23/207

Primary Examiner—Oscar R. Vertiz
Assistant Examiner—Hoke S. Miller
Attorneys—Charles C. Fellows, Frank Ianno and Eugene G. Seems ABSTRACT: An improvement in the catalytic hydrogenation of an anthraquinone working compound is obtained during the production of hydrogen peroxide by employing a hydrogenation catalyst containing 0.05 to 5 percent of palladium dispersed over the surface of alumina supporting spheres, said spheres having substantially no pores larger than about 0.06 microns in diameter, having a BET surface area of between 20 and 200 m.$^2$/g., and having the palladium metal penetrating the pores of the support surface no greater than about 50 microns.

3,615,207

PRODUCTION OF HYDROGEN PEROXIDE BY ANTHRAQUINONE PROCESS

BACKGROUND OF THE INVENTION

1. Field of the Invention

This invention relates to producing hydrogen peroxide by the anthraquinone process in which novel catalysts are used to carry out hydrogenation of an anthraquinone working compound.

2. Description of the Prior Art

It is known that anthraquinone compounds, e.g., 2-ethylanthraquinone, and their tetrahydro derivatives can be used as working compounds in a process for producing hydrogen peroxide. In this process, commonly known as the anthraquinone process, a working compound is dissolved in a suitable solvent, mixture of solvents, to form a working solution which is alternately reduced and oxidized. During the reducing stage, the working compound is hydrogenated in the presence of a catalyst to reduce it to its "hydroquinone" form. In the subsequent oxidation step the hydrogenated working compound is oxidized with air, oxygen or other oxygen-containing gases to convert it to its "quinone" form with concomitant formation of hydrogen peroxide. The hydrogen peroxide product is then removed from the working solution, preferably by extraction with water, and the remaining working solution is recycled to the hydrogenator to again commence the cyclic process for producing hydrogen peroxide. The detailed operation of this process is described fully in U.S. Pat. Nos. 2,158,525, 3,009,782 and 2,215,883.

The catalytic hydrogenation described above may be carried out in either a "fluid bed" or "fixed bed" process. The catalyst in the "fluid bed" process has a size of about 20 to 200 mesh (0.8 to 0.07 mm.) and is kept suspended in a portion of the working solution which is maintained in the hydrogenator. The working solution and hydrogen are passed through a catalytic hydrogenator continuously, and the suspended catalyst is mildly agitated to promote hydrogenation of the working solution. In a "fixed bed" hydrogenator the catalyst, normally having a size of 3 to 100 mesh (6.35 to 0.149 mm.) is supported in a fixed position, preferably between porous support plates or screens, and both hydrogen and the working solution are passed simultaneously through the supported catalyst mass either concurrently or countercurrently. In this system, the catalyst is never suspended in the working solution.

One of the major costs of operating the above-defined anthraquinone process for producing hydrogen peroxide is the cost of the catalyst. Periodically as its activity decreases with time, the catalyst must be replaced in order to maintain the desired rate of hydrogenation of the anthraquinone working compound. Accordingly, any technique which will permit greater amounts of hydrogen peroxide to be produced in a commercial plant by an existing catalyst bed or which will permit a plant to produce its normal quota of peroxide using smaller amounts of catalyst is most desirable because it reduces the cost of operating the process.

The catalyst generally employed is comprised of so-called Raney nickel or noble metals, i.e., platinum, rhodium, and palladium, particularly palladium, In the case of Raney nickel, the hydrogenation can be directed almost entirely to the reduction of the quinone group. Unfortunately, Raney nickel catalysts are very readily poisoned by oxygen and hydrogen peroxide. Therefore, the working solution must be subjected to extremely involved and careful filtration and extraction procedures to remove traces of hydrogen peroxide or oxygen prior to being recycled to the hydrogenation stage. Moreover, nickel catalysts cannot be regenerated and must be replaced as soon as the catalytic activity falls off.

In an effort to overcome the serious disadvantages of Raney nickel catalysts, U.S. Pat. No. 2,657,980 issued to Sprauer, teaches that palladium metal deposited on an activated alumina carrier gives acceptable conversion of the quinone group to the hydroquinone substituent, without being sensitive to residual hydrogen peroxide or oxygen present in the working solution. Additionally, this catalyst can be readily regenerated when its activity falls off. These palladium catalysts have relatively long effective lives.

Palladium metal is typically deposited on crushed aggregate of −80 to +200 mesh size for use as catalysts in suspension or fixed bed catalytic reactors. Recently 0.15 to 6.5 millimeter diameter alpha alumina monohydrate and gamma alumina spheres and occasionally cylindrically shaped support materials have been coated with palladium and used in fixed bed catalytic reactors. When the palladium is deposited on the crushed aggregate gate-type support, the palladium has a tendency to preferentially deposit as relatively thick layers, in the cracks and crevices in crushed aggregate support materials, rather than depositing as a coating of uniform thickness over the external geometric surface of the crushed aggregate particles. This tendency of the metal to preferentially deposit in thick layers in the areas of cracks and crevices is particularly true for catalyst supports that have a relatively low surface area measured by the BET (Brunauer, Emmett and Teller) method. The BET method is described by Brunauer, Emmett and Teller in their article "Adsorption of Gases in Multimolecular Layers" in the Journal of the American Chemical Society, Vol. 60, pg. 309, Feb. 1938, and in detail by S. J. Gregg and K. S. W. Sing in their book, Adsorption, Surface Area and Porosity, published in 1967 by the Academic Press of London and New York. Corundum, dolomite, quartz, silicas and carbides are typical low surface area catalyst support materials. Since much of the palladium deposited on crushed aggregate is covered by other palladium metal deposits in the form of relatively large crystallites, this metal is not available for the catalytic reaction. Moreover, when crushed aggregate catalysts are used in packing a fixed bed, some of the poorly coated projections on one particle will rest in a crevice of an adjacent particle and this also tends to cover part of the available catalytic surface. Further, when operating a fixed bed using a liquid and a gas flowing concurrently through the bed because of the surface tension of the liquid, the working solution has a tendency to fill the remaining space available in cracks and crevices in the crushed aggregate with liquid, thereby giving poor gas liquid distribution in a catalytic bed. All these factors tend to reduce the efficiency of the crushed aggregate catalyst system for the desired hydrogenation reaction. It has also been observed in some instances that the metal that does deposit on the more accessible areas of a crushed aggregate catalyst support is poorly bonded to the surface and is easily lost.

An attempt was made to overcome the deficiencies of the crushed aggregate catalyst support by preparing spherical supports from alpha-alumina monohydrate and gamma-alumina or both. Unfortunately, when used in the anthraquinone hydrogen peroxide process, palladium metal deposited on this support material had a rather short active life. The small amounts of water which are inherent in the process apparently attrited the metal from the surface of the alpha and gamma-alumina spheres.

SUMMARY OF THE INVENTION

I have now discovered that certain spherical shaped catalyst supports covered with a highly dispersed coating of palladium metal are excellent catalysts for fixed bed production of hydrogen peroxide by the anthraquinone process. The improved hydrogenation catalysts contain at least 0.05 percent and preferably 0.1 to 5 percent by weight metallic palladium dispersed on 0.15 to 6.5 millimeter diameter support spheres, which have pores no larger than about 0.06 microns, a BET surface of over 20 square meters per gram, and the palladium metal penetration of the surface pores of the support spheres is no more than about 40 to 50 microns. Preferably the support spheres are alumina spheres having their major crystalline structure in the form of delta-alumina, theta-alumina or mixtures of delta-alumina and theta-alumina, and being substantially free of alpha-alumina, gamma-alumina or alpha-alumina monohydrate. These preferred alumina spheres have substantially no pores whose diameters are larger than about 0.06 microns.

This process has the advantages of requiring less metallic palladium catalyst because the spherical shaped support in a packed fixed bed has essentially point contact between the catalytic spheres thereby resulting in maximum exposure of the catalyst surface to the anthraquinone working solutions. The low bulk density and high metal dispersion gives more efficient utilization of the palladium metal on the catalyst and therefore less palladium is required in a given reaction vessel.

Surprisingly, regeneration of this catalyst is not necessary. After several hundred to over 1,000 hours of operation, the catalyst retained over 97 percent of its original activity. Ordinarily, a catalyst such as palladium metal on dolomite has to be periodically regenerated every 48–96 hours when used in the anthraquinone process for making hydrogen peroxide.

DESCRIPTION OF THE INVENTION AND THE PREFERRED EMBODIMENTS

As is well known, any alkylated anthraquinone and its corresponding anthrahydroquinone may be used as organic intermediates in this type of a cyclic process. Specific examples of suitable alkylated anthraquinones are 2-ethyl-, 2-isopropy-, 2-sec-butyl-, 2-t-butyl-, 2-sec-amyl-, 1,3-dimethyl-, 2,3-dimethyl-, 1,4-dimethyl-, 2,7-dimethyl-anthraquinone, and the like. The corresponding tetrahydroanthraquinones may also be employed. The preferred alkylated anthraquinone for use in practicing this invention is 2-ethylanthraquinone and tetrahydro-2-ethylanthraquinone.

Many solvents and mixtures of solvents are known to be useful to dissolve the anthraquinone during the hydrogenation stage and to dissolve the anthrahydroquinone during the oxidation stage. It is preferable that the solvent or solvent mixture used function satisfactorily in both stages of the process. Solvents consisting of mixtures of compounds such as benzene, toluene, and the like with an alcohol such as amyl alcohol, cyclohexanol and the like have been suggested for this purpose. Particularly useful solvent mixtures for use in this process include, but are not limited to, alkyl benzenes containing 9–11 carbon atoms and trialkyl phosphate esters. The preferred solvent mixture for use in this process is a mixture of $C_9$ and $C_{10}$ alkylbenzenes with tris(2-ethylhexyl) phosphate.

The catalysts useful in practicing this invention are spherical shaped supports having a diameter of 0.15 to 6.5 millimeters having surface pores no larger than about 0.06 microns in diameter containing a highly dispersed palladium metal coating deposited uniformly on the surface of the sphere, the palladium metal penetrating the surface pores no more than about 40 to 50 microns. The uniform dispersion of palladium metal over the outer surface of the sphere and the excellent adhesion of the metal to the support are the prime factors contributing to the excellent performance of these catalysts. Particularly useful, or preferred spherical supports, are spherical alumina supports containing essentially no alpha alumina monohydrate or gamma alumina, a BET surface between 20 and 200 m.$^2$/gm., normally about 90 m.$^2$/gm., surface pores whose diameters vary from about 0.035 to 0.06 microns, and have their major crystalline structure in the form of delta-alumina, theta-alumina or mixtures of delta-alumina and theta-alumina. The bulk density of these spherical alumina supports varies somewhat depending on the diameter of the spheres, for example, 2 mm. diameter alumina spheres (about five sixty-fourths) have a bulk density of about 0.78 gram per cc. A typical catalyst of this invention containing 0.3 percent palladium metal deposited uniformly over a 2 mm. diameter sphere support of the alumina described above, with a BET surface of 90 m.$^2$ per gram and substantially no pores with diameters of larger than 0.06 microns had a productivity of 12–13 pounds of hydrogen peroxide per day per pound of catalyst. After 1,200 hours use in a fixed bed reactor, this catalyst had better than 96 percent of the initial palladium metal remaining on the support after the run was completed. Surprisingly, the catalyst did not have to be regenerated during or after the 1,200 hour run (50 days).

The porosity of the catalyst support is determined by measuring the volume of sample that is penetrable by mercury when the pressure is increased from 1.8–5,000 p.s.i. absolute. The porosity of a sample can be determined readily using an Aminco-Winslow Porisometer, manufactured by the American Instrument Company, Incorporated, of Silver Spring, Md., which is designed to permit pressures of up to 5,000 p.s.i. absolute to be exerted on mercury used to penetrate the pores. In using this technique, the sample is initially subjected to mercury under a pressure of 1.8 p.s.i. absolute. At this pressure, the mercury penetrates all voids and surface cracks which are larger than 100 microns. As the pressure on the mercury is increased, up to 5,000 p.s.i. absolute, the mercury penetrates increasingly smaller pores in the sample. If desired, the cumulative volume of mercury which penetrates the sample at a given pressure is then recorded at pressures up to 5,000 p.s.i. absolute. The pressure necessary to penetrate pores of a given diameter is known and the volume penetration can be plotted against pore size (diameter). In this way, the volume of the pores corresponding to any given pore size can be determined for a sample. The term "pores" as used in the specification and claims excludes all voids, surface cracks and openings larger than 100 microns.

In accordance with the practice of this invention, it is desired that the catalyst and working solution have a relatively short time of contact in the presence of hydrogen. U.S. Pat. No. 3,009,782 disclosed a fixed bed hydrogenator containing a palladium metal catalyst in which the palladium was deposited on a crushed aggregate support of uniform size, 4 to 100 mesh (U.S. Standard Sieve Series of 1940), which permitted passing the liquid quinone carrying working solution through the fixed bed at the rate of 20 to 200 liters of liquid per minute per square foot of catalyst bed cross section. The present process, employing palladium metal uniformly deposited on the surface of a spherical catalyst support of 0.15 to 6.5 millimeters in diameter, permits the liquid working solution to be passed through a fixed bed at rates of over 400 liters per minute per square foot of catalyst bed cross section. Thus, substantially higher daily production rates may be attained for a given hydrogenator using the process of this invention.

The process of this invention is operated at the usual temperatures and pressures known to be useful in producing hydrogen peroxide by the anthraquinone process. The fixed bed hydrogenator can be operated at pressures between about 5 and about 100 p.s.i.g. (pounds per square inch gage). Typically the hydrogenator is operated at pressures between 30 and 60 p.s.i.g. and preferably is operated pressures between about 45 and about 50 p.s.i.g. The fixed bed hydrogenator can be operated at temperatures between ambient or about 20° to about 150° C.; typically, it is operated at temperatures between 20° and about 70° C., and preferably the temperature is maintained between about 45° to about 55° C.

The working solution, after leaving the catalytic hydrogenator, is passed into an oxidizer where it is contacted with air or oxygen. In the normal mode of operation, the working solution flows continuously into the base of an oxidizing tank and is removed as oxidized overflow through a standpipe at the top of the oxidizing vessel. Air, oxygen or other oxygen-containing gas is pumped into diffusers or other gas dispersing means located at the base of the oxidizing vessel and is released as a continuous upward flow of dispersed bubbles passing through the working solution. The oxidation reaction normally takes place at atmospheric pressures, although subatmospheric or superatmospheric pressures may be employed in the oxidizer. Temperatures of from about ambient (about 20° C.) up to about 65° C. can be employed in the oxidizer although 45° to 55° C. is preferred. During this oxidation stage, the anthraquinone working compound is oxidized to its "quinone" form with concomitant release of hydrogen peroxide.

The oxidized mixture is removed from the oxidizer and subjected to a water extraction in a conventional extractor to dissolve the hydrogen peroxide, preferentially, in the aqueous extract phase. The raffinate and water extract are then permitted to separate into an organic phase and a water phase. The water phase, containing most of the hydrogen peroxide, is separated from the organic phase and passed to distillation units to purify and concentrate the hydrogen peroxide, while the organic phase, made up essentially of the working solution, is recycled to the hydrogenator to once again commence the cycle for producing hydrogen peroxide.

"Fluid bed" type hydrogenators usually employ a catalyst of small size, e.g., 20 to 200 mesh and the catalyst is kept suspended in a portion of the working solution which is maintained in the hydrogenator. The working solution and hydrogen are passed through the catalytic hydrogenator continuously, and the suspended catalyst is mildly agitated to promote hydrogenation of the working solution. Generally, this agitation is achieved by passing a rising stream of hydrogen near the bottom of the hydrogenator in an amount sufficient to create turbulence throughout the working solution containing the suspended catalyst. The hydrogenated working solution is oxidized and the hydrogen peroxide recovered in essentially the same manner as the hydrogen peroxide produced by the "fixed bed" process described above.

The following examples illustrating the novel process disclosed herein are given without any intention that the invention be limited thereto. All parts and percentages, unless otherwise noted, are by weight.

EXAMPLE 1

Preparation of the Catalyst

To a 1-liter, fluted, three-necked Pyrex flask fitted with a high-speed two-bladed agitator, a reflux condenser and a thermoregulator was added 500 cc. of deionized water, 1 cc. of 88 percent formic acid and 6.25 grams of atomized aluminum metal (99.5 percent purity, surface area of 310,000 mm.$^2$/g.; particle size distribution of 5–50 microns). The agitator was set to rotate at 1,800 r.p.m. and the reaction was initiated at room temperature. As the temperature rose, the rate of hydrogen production increased. The temperature was allowed to reach 100° C. and maintained at this temperature. At the end of 1.5 hours an additional 6.25 grams of aluminum metal and 10 cc. of 0.684 molar formic acid were added to the reaction mixture. Further equal additions of aluminum metal were made at 3.5, 4.5, 5 and 6 hours total reaction time, so that a total of 25 grams of aluminum metal had been added. During the time interval of 2–6 hours, 0.684 molar formic acid solution was added until a total of 0.095 moles of 100 percent formic acid had been added. The reaction was allowed to continue for a total of 12 hours at the end of which the reaction mixture was completely free of aluminum, and had a pH of 3.4.

The resulting amorphous/boehmite slurry had a composition of 34 percent by weight amorphous alumina and 66 percent by weight boehmite (18A boehmite crystal size). This slurry composition was mixed with calcined gamma-alumina in amounts sufficient so that the added gamma-alumina represented 40 percent by weight of the total alumina in the mixture, and the mixture was had at high speed in a Waring Blender to obtain the desired fluidity. The added calcined gamma-alumina had a particle distribution by weight of 4 percent 1.8–2.0 microns; 16 percent 2–5 microns; 35 percent 5–10 microns; 45 percent 10–22 microns. The resulting slurry was then fed to an oil column 10 feet in length and 4 inches in diameter via a cylindrical stainless steel head to which were attached 9 to 8 gauge hypodermic syringe needles. The slurry was supplied to this head by means of a peristalic type pump so that there would be a constant discharge rate from the syringe needles. The immiscible medium employed in the oil column was a mixture of 77 percent by volume of a 65/75 SUS viscosity mineral oil and 23 percent by volume of carbon tetrachloride. Gaseous ammonia was added to the oil/carbon tetrachloride mixture at the rate of 1–5 ml./min. by means of a porous sparger located in the bottom portion of the column to substantially saturate the mixture. At the upper portion of the column there was attached an exhaust system so that the droplets emanating from the syringe needles would not coagulate immediately upon striking the free, ammonia-containing space above the oil/carbon tetrachloride level. As the droplets contacted the oil/carbon tetrachloride surface, they immediately began to gel, and assumed a spheroidal shape which was retained and became more firm as they descended through the immiscible medium in the column. The spheres were collected in a suitable container attached to the bottom of the oil column. They were then drained free of oil, aged for 15 minutes in a 6 percent aqueous ammonia solution, washed with water, and dried by passing heat air at 110° c. over the spheres until no more than 5 percent free water remained. The spheres, having a size of about 10 mesh (2 mm. or about five sixty-fourths of an inch), were then calcined at 950° C. for four hours until the alumina was substantially all in the form of theta-alumina and delta-alumina, with the predominant form being the theta-alumina. The calcined spheres had a BET surface area of 90 m.$^2$/g and a pore distribution, when tested on an Aminco-Winslow porisometer, in which substantially all the pores were smaller than about 0.06 microns. The pores were found to be present starting at about 0.06 microns to 0.035 microns in diameter, when measured at Hg. pressures up to 5000 p.s.i. absolute, the pressure limit of the testing apparatus. Substantially no pores were found between about 15 microns and about 0.06 microns. Total pore volume was 0.61 cc./gm.

The above calcined spheres were then impregnated with an aqueous solution of sodium palladium chloride having a concentration of 1 percent by weight, expressed as palladium. Palladium was precipitated on the spheres by heating the impregnated spheres up to the boiling point of the solution. The metal coated spheres were treated with excess 37 percent formaldehyde to activate the palladium metal. The spheres were then separated from the aqueous, sodium palladium chloride solution, water washed and dried at 110° C. The deposited palladium constituted 0.3 percent by weight of the resulting catalyst and was uniformly and adherently deposited over the entire surface of the spheres, penetrating into the pores of the alumina surface no more than about 40 to 50 microns.

Process of the Invention—Run 1

An anthraquinone working solution was made up by mixing together 75 percent by volume of a commercially available, mixed aromatic solvent containing about 99.6 percent aromatics, having a boiling point range of 182° to 204° C. obtained from Shell Chemical Company and identified as Cyclosol 63 and having an aromatic content of about 82.3 percent $C_8$—$C_{12}$ alkyl benzene, 80 percent of which is $C_{10}$—$C_{11}$ alkyl benzene, and 13.3 percent cycloaklyl benzene, 3.5 percent $C_{10}$ diaromatic (naphthalene), with 25 percent by volume of tris(2-ethylhexyl) phosphate. Thereafter 10 percent by weight of 2-ethylanthraquinone was dissolved in the mixed solvent.

A fixed bed catalytic hydrogenator was prepared in a glass tube measuring 1 inch in diameter by placing the catalyst prepared above on a support screen in the glass tube until a depth of 3 to 4 feet was obtained. The exact depth of the bed is set forth in table I.

The above-defined working solution and an excess of gaseous hydrogen under a pressure of about 30 p.s.i.g. were passed concurrently downwardly through the catalyst bed at a flow rate of 73.5 l./min./sq. ft. of catalyst bed cross section. The temperature in the catalyst bed was maintained between 45° and 50° C. The hydrogenated working solution recovered from the base of the hydrogenator was pumped into an oxidizing vessel.

The stream of hydrogenated working solution passed into the oxidizer was then oxidized by passing air through the working solution until oxidation of the solution was complete. The temperature of the solution in the oxidizer was maintained at from 45°–55° C. The oxidized working solution was removed from the oxidizer continuously and passed into an extraction unit where it was subjected to water extraction to dissolve the hydrogen peroxide, preferentially, in the aqueous extract phase.

THe raffinate and water extract were then permitted to separate into an organic phase and a water phase and the water phase, containing most of the hydrogen peroxide, was separated from the organic phase. The remaining organic phase, which was made up essentially of the working solution, was recycled to the hydrogenator to again commence the cycle for producing hydrogen peroxide.

The above cyclic processing was carried out for periods of from 40–80 hours, as indicated in table I. The productivity of the catalyst in terms of pounds of hydrogen peroxide (100 percent basis) produced per day per pound of catalyst, as well as the amount of hydrogen peroxide produced in pounds of hydrogen peroxide per day per pound of palladium, was then determinded for the catalyst. These are reported in table I.

Prior Art Examples—Runs A, B and C

The above procedure was repeated in runs A, B and C with the exception that known catalysts were employed. The catalysts, their property, and their peroxide productivity are set forth in table I.

Example 2

Process of the Invention—Runs 2, 3 and 4

The procedure of example 1, run 1 was repeated, except that larger sized equipment was utilized. One hydrogenator had a diameter of 5.4 inches while another had a diameter of 5 feet and the fixed beds therein had the depth specified in table II. In this example 5.4 inch diameter hydrogenator was operated at 50–60 p.s.i.g. pressure and at a temperature of 48°–60° C. The second, 5-foot diameter reactor was run at 45–50 p.s.i.g. pressure and at a temperature of 50–58° C. The working solution and excess hydrogen were passed into the top of the fixed beds at an average rate of 35 gallons per minute. Thereafter, the hydrogenated working solution was passed into the base of an oxidizing vessel, and air was passed up through the working solution until oxidation of the solution was complete. The temperature of the solution in the oxidizer was maintained at 45–55° C. Thereafter, the oxidized working solution was removed from the oxidizer and extracted with water to remove hydrogen peroxide in the aqueous phase. The remaining working solution which was separated from the aqueous phase in the extractor was then recycled to the hydrogenator for additional processing. The catalyst descriptions, reactor size, and productivity of hydrogen peroxide in pounds per day per pound of catalyst are all shown in table II.

Prior Art Examples—Runs D, E and F

The above runs, namely, 2, 3 and 4 were duplicated using the prior art catalysts set forth in table II. The catalyst of run D was new, while the catalysts of runs E and F were used previously for 5 and 4 months respectively, as anthraquinone hydrogenation catalysts. The results of these tests are set forth as examples D, E and F in table II.

In the above example, run 2 was continued for 1,579 hours during which the spherical catalysts of this invention retained 96 percent of its initial metal content. The catalyst used in run 4, after 7 months continuous use, retained over 96 percent of its original catalytic activity. productivity of this catalyst was essentially unchanged during all of the runs, without regeneration.

In contrast to this, the dolomite catalyst of run E, after use for only 5 months, still had over 90 percent of the original metal, but had only 54 percent of its activity and had to be regenerated every 48 to 96 hours to maintain this reduced activity. Microscopic examination of the dolomite catalyst showed that the metal still present was mainly in the cracks, crevices and pores of the catalyst and that there was little or no active metal left on the outer surfaces available for catalysis, by contrast, the catalyst of the invention retains the palladium metal on the entire surface of the supporting spherical carrier.

EXAMPLE 3

Process of the Invention—Run 5—Fluid Bed

A fifth run was carried out using a sphere catalyst produced by the method described in example 1 except that this catalyst had a size of 0.07 to 0.15 millimeter diameter (100 to 200 mesh) and had 2.0 percent palladium deposited on the alumina spheres.

A working solution was prepared by dissolving 130 grams of 2-ethylanthraquinone per liter of the solvent mixture described in example 1. This working solution was exposed to hydrogen in a hydrogenation apparatus in the presence of the catalyst which was kept fluidized by hydrogen gas flow at a temperature of 45° C. at a solution flow of 500 liters of solution per hour and a gas flow of 2,580 liters of hydrogen per hour. The hydrogen uptake corresponded to 46 percent hydrogenation of the 2-ethylanthraquinone present, and almost quantitative utilization of the hydrogen. THe catalyst was separated by filtration and the hydrogenated solution was oxidized at 43°–45° C. with an amount of air to provide a 30 percent excess of oxygen over the amount required to complete the oxidation. Hydrogen peroxide was produced in the amount of 9 grams per liter of working solution. This hydrogen peroxide solution was extracted by water in an extraction column, and the organic phase returned to the hydrogenator for further cyclizing.

TABLE I

| | Catalyst | | | | | | Productivity of (100%) $H_2O_2$ | |
|---|---|---|---|---|---|---|---|---|
| Run | Size | Metal | Carrier | BET surface area (m.²/gm.) | Pore size (diam. in microns) | Reactor size | Lb./day/lb. catalyst | Lb./day/lb. palladium |
| 1 | 5/64 in. (2 mm.) sphere | 0.3% palladium | Delta-, theta-alumina | 90 | <0.06 | 1 in. x 4 ft. | 12.1 | 4,050 |
| A | 10–16 mesh | do | Crushed dolomite | <5 | (¹) | 1 in. x 3 ft. | 3.40 | 1,136 |
| B | 8–14 mesh | do | Corundum | <5 | (¹) | 1 in. x 4 ft. | 4.24 | 847 |
| C | 8–12 mesh | do | Activated alumina ² | 200 | ³ 4.5–0.45 | 1 in. x 4 ft. | 5.4 | 1,780 |

¹ Non-measurable.  ² Alpha-alumina monohydrate.  ³ Average 1.8.

TABLE II

| Run | Catalyst | | | BET surface area (m.²/gm.) | Pore size (diam. in microns) | Original condition | Reactor size | Productivity of (100%) H₂O |
| | Size | Metal | Carrier | | | | | |
|---|---|---|---|---|---|---|---|---|
| 2 | 5/64 in. (2 mm.) sphere | 0.3% palladium | Delta-, theta-alumina | 90 | <0.06 | New | 5.4 in. x 7 ft | 15.16 |
| 3 | do | do | do | 90 | <0.06 | New | 5.4 in. x 5 ft | 12.9 |
| 4 | do | do | do | 90 | | New | 5.0 ft. x 5 ft | 5.5 |
| D | 10-16 mesh | do | Dolomite | <5 | (¹) | New | 5.4 in. x 10 ft | 3.78 |
| E | do | 0.28% palladium | do | <5 | (¹) | 5 months old | 5.4 in. x 14.6 ft | 2.03 |
| F | do | do | do | <5 | (¹) | 4 months old | 5.0 ft. x 7 ft | 1.17 |

¹ Non-measurable.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the method of producing hydrogen peroxide by the alternate reduction and oxidation of an alkylated anthraquinone as the working material dissolved in a solvent and constituting a liquid working solution, and wherein the working solution is hydrogenated by contact with hydrogen in the presence of a hydrogenation catalyst, the improvement which comprises contacting said working solution and hydrogen at temperatures of from about 20° to 150° C. and at pressures of from about 5 to 100 p.s.i.g. in the presence of a spherical catalyst having a size of about 0.07 to about 6.5 millimeters in diameter and consisting essentially of 0.05 to about 5 percent by weight of metallic palladium dispersed essentially uniformly over the surface of alumina supporting spheres, said alumina supporting spheres:
   a. having as their major crystalline structure a member selected from the group consisting of delta-alumina and theta-alumina,
   b. being substantially free of either alpha-alumina, gamma-alumina, or alpha-alumina monohydrate,
   c. having substantially no pores whose diameter are larger than about 0.06 micron,
   d. having a bet surface area of from about 20 to 200 m.²/g., and
   e. having said metallic palladium penetrating into their surface pores no more than 50 microns.

2. The method of producing hydrogen peroxide according to claim 1 in which the alkylated anthraquinone in the working solution is contacted with hydrogen in the presence of said spherical palladium catalyst, the catalyst being fluidized in the working solution.

3. In the method of producing hydrogen peroxide by the alternate reduction and oxidation of an alkylated anthraquinone as the working material dissolved in a solvent and constituting a liquid working solution, and wherein the working solution is hydrogenated by contact with hydrogen in the presence of a hydrogenation catalyst, the improvement which comprises contacting said working solution and hydrogen at temperatures of from about 20° to 150° C. and at pressures of from about 5 to 100 p.s.i.g. in the presence of a spherical catalyst having a size of about 0.15 to about 6.5 millimeters in diameter and consisting essentially of 0.05 to about 5 percent by weight of metallic palladium dispersed essentially uniformly over the surface of alumina supporting spheres, said alumina supporting spheres:
   a. having as their major crystalline structure a member selected from the group consisting of delta-alumina and theta-alumina,
   b. being substantially free of either alpha-alumina, gamma-alumina, or alpha-alumina monohydrate,
   c. having substantially no pores whose diameter are larger than about 0.06 micron,
   d. having a BET surface area of from about 90 to 200 m.²lg., and
   e. having said metallic palladium penetrating into their surface pores no more than 50 microns.

4. The method of producing hydrogen peroxide according to claim 3 in which the working solution is contacted with hydrogen in a fixed bed of said catalyst.

* * * * *

UNITED STATES PATENT OFFICE
CERTIFICATE OF CORRECTION

Patent No. 3,615,207          Dated October 26, 1971

Inventor(s)  Nathan D. Lee

It is certified that error appears in the above-identified patent and that said Letters Patent are hereby corrected as shown below:

Column 1, line 17 "mixture" should read --or mixture--.

Column 4, line 53 "operated pressures" should read --operated at pressures--.

Column 5, line 65 "had" should read --agitated--.

Column 6, line 56 "Cyclosol 63" should read --Cyclosol 63®--.

Column 6, line 70 "concurrently" should read --cocurrently--.

Column 9-10 Table II heading "Poor size (diam. in microns)" should read --Pore size (diam. in microns)--.

Column 9-10 Table II, Run 4 under Pore size "-----" should read --<0.06--.

Column 9-10 Table II heading "Productivity of (100%) $H_2O$" should read --Productivity of (100%) $H_2O_2$--.

Column 10, line 39 claim 3 "$m.^2 lg.,$" should read --$m.^2/g.,$--.

Signed and sealed this 10th day of September 1974.

(SEAL)
Attest:

McCOY M. GIBSON, JR.          C. MARSHALL DANN
Attesting Officer             Commissioner of Patents